United States Patent
Ewert et al.

(10) Patent No.: US 7,054,620 B2
(45) Date of Patent: May 30, 2006

(54) METHOD FOR DEFERRED LOCATION REPORTING IN A RADIO CELLULAR NETWORK

(75) Inventors: Jorg Christian Ewert, Herzogenrath (DE); Martin Stumpert, Hochspeyer (DE); Enrico De Luca, S. Nicola La Strada (IT); Alessandro Lala, Naples (IT); Maurizio Iovieno, Mercato S. Severino (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 216 days.

(21) Appl. No.: 10/474,383

(22) PCT Filed: Apr. 10, 2002

(86) PCT No.: PCT/EP02/03994

§ 371 (c)(1),
(2), (4) Date: Oct. 9, 2003

(87) PCT Pub. No.: WO02/085049

PCT Pub. Date: Oct. 24, 2002

(65) Prior Publication Data

US 2004/0106414 A1    Jun. 3, 2004

(30) Foreign Application Priority Data

Apr. 10, 2001  (EP) .................................. 01108971
Jan. 11, 2002   (EP) .................................. 02000678

(51) Int. Cl.
*H04M 3/42*    (2006.01)
*H04M 3/493*   (2006.01)
*H04Q 7/22*    (2006.01)

(52) U.S. Cl. .............................. 455/414.2; 455/412.2; 455/432.1; 455/456.1; 455/456.3; 701/207; 340/988; 342/457

(58) Field of Classification Search ............. 455/412.2, 455/414.2, 432.1, 456.1–456.6; 701/207, 701/214, 216; 340/988; 342/457, 357.1, 342/357.06, 357.12

See application file for complete search history.

(56) References Cited

U.S. PATENT DOCUMENTS

| | | | | |
|---|---|---|---|---|
| 5,982,324 A * | 11/1999 | Watters et al. | ......... | 342/357.06 |
| 6,091,949 A * | 7/2000 | Sanchez | ...................... | 455/417 |
| 6,177,905 B1 * | 1/2001 | Welch | .................... | 342/357.13 |
| 6,199,045 B1 * | 3/2001 | Giniger et al. | ................. | 705/1 |
| 6,252,544 B1 * | 6/2001 | Hoffberg | ................. | 342/357.1 |
| 6,259,381 B1 * | 7/2001 | Small | ......................... | 340/988 |
| 6,388,618 B1 * | 5/2002 | Stilp et al. | ................... | 342/457 |
| 6,799,032 B1 * | 9/2004 | McDonnell et al. | ......... | 455/410 |

FOREIGN PATENT DOCUMENTS

WO    WO99-52316    * 10/1999

* cited by examiner

*Primary Examiner*—Steve M. D'Agosta

(57) ABSTRACT

The invention relates to the provision of deferred location reporting wherein the reporting is triggered by a trigger location change event. Trigger location change events are either related to a user of a cellular telecommunication network entering, leaving or changing an area, or to an area, which is entered or left by a user.

14 Claims, 1 Drawing Sheet

METHOD FOR DEFERRED LOCATION REPORTING IN A RADIO CELLULAR NETWORK

TECHNICAL AREA

The invention relates to methods, a node and a user equipment for deferred reporting of a location of a user of a cellular telecommunication network to a client.

PRIOR ART

Location reporting is used for providing a client with information about the location of a user. For a client, for example a charging subsystem, emergency services, user equipment of the user or location services, it is necessary to know the location of a user.

One way to implement location reporting is described in the 3GPP Technical Specification TS 25.305 Version 3.3.0, published September 2000. It describes direct location reporting by using a cell identifier, forced state transition of user equipment and the transforming of cell identification into geographical coordinates in a radio network controller.

The 3GPP Technical Specification TS 23.271 Version 3.3.0 published September 2000 describes how direct location reporting can be implemented by using positioning methods. Said positioning methods are based for example on GPS (Global Positioning System), cell identification, observed time difference of arrival, or E-OTD (Enhanced Observed Time Difference).

The 3GPP specification TS 122 071 version 3.3.0 of October 2000 introduces deferred location reporting. However, it lacks a description of how to implement it.

The international patent application WO99/52316 published on Oct. 14 of 1999 describes a method and a system for exploiting location dependent services in a cellular radio system. To that end it is described that user equipment is enabled to determine its location by means of determining the base transceiver station it is served by or the cell it is located in. However, the provision of its location to a client is not disclosed.

Thus, neither document of prior art describes how to implement deferred location reporting in a way that a location of a user is provided by means of geographical data to a client external to the network.

Therefore it is object of the invention to overcome the shortcomings of the prior art.

SUMMARY OF THE INVENTION

It is advantageous to define at least one trigger location change event for initiating a deferred location report. This allows keeping location information about a user up to date for at selectable granularity.

Advantageous is the choice for the trigger location change event between the change, an entering, or a leaving of one an area served by a mobile services switching centre, a serving General Packet Radio Service support node, a cell, a location area, a routing area, or a service area. This enables to select an optimal compromise between accuracy and signalling effort.

Also advantageous is the execution of a positioning method. This allows determining the location of a user with a high accuracy.

Further advantageous is the dedication of accuracy of location information by the user. This allows the user to influence the level of information provided to a client.

Also advantageous is the monitoring and detecting of a trigger location change event by user equipment. This reduces the implementation effort of the invention as the trigger location change events are already detected in existing user equipment for cellular telecommunication systems. It furthermore reduces the signalling effort in the case that the user of the user equipment changes from one mobile services switching centre to another mobile services switching centre as no indication that location reporting is activated for the user has to sent between mobile services switching centres.

Further advantageous is the monitoring and detecting of a trigger location change event by user equipment. This reduces the implementation effort of the invention as the trigger location change events are already detected in some nodes of cellular telecommunication systems and it does not require a modification of user equipment.

Advantageous is the storing of an indicator that a trigger location change event is defined for a subscriber. This avoids the loss of information about deferred location requests at a hand-over.

Further advantageous is the dependence on a user's permission to provide location information. This secures the privacy of a user.

Advantageous is the definition of a trigger location change event as the entering or leaving of a particular predefined area. This allows monitoring predefined areas instead of predefined users.

The invention introduces a method for deferred provision of location information of a user of a cellular telecommunication network to a client. The method comprises the steps of defining or receiving a definition of at least one trigger location change event for a user, receiving from a client a request for provision of deferred location information for the user, monitoring said trigger location change event for said user, detecting the occurrence of the trigger event, determining the location of the user, and providing the location of the user to the client.

A trigger location change event is a change, an entering, or a leaving of one an area served by a mobile services switching centre, a serving General Packet Radio Service support node, a cell, a location area, a routing area, or a service area.

The step of determining the location of the user can comprise the execution of a positioning method. Positioning methods are known from the technical specifications cited under prior art.

If location information of a user is related to a structure of the cellular telecommunication network, for example by giving an identification of a cell, a service area, a location area, an area served by a mobile services switching centre, or an area served by a GPRS support node, it can be transferred into location information related to geographical coordinates. An example for this is given under prior art, wherein a radio network controller transforms cell identification into geographical coordinates.

The user may dedicate the accuracy of location information provided to the client.

In an embodiment of the invention, the user equipment performs the monitoring and detecting of a trigger location change event and initiates the provision of the location to the client, but this can be also performed by a node of the cellular telecommunication network.

If a network node performs the monitoring and determining, an indicator that a trigger location change event is defined for the subscriber is stored in a node, storing subscriber data.

An additional step of verifying that the user granted a permission to provide the client with location information can be executed.

The trigger location change event can be the entering or leaving of a particular predefined area. This trigger can be set independent from any user, related only to the selected area. Additional to the location information, information about the velocity of a user when entering or leaving the particular predefined area can be provided to the client.

If the monitoring and detection of a trigger location change event is performed by a node of the cellular telecommunication network, said node comprises means for monitoring whether a change an entering, or a leaving of one an area served by a mobile services switching centre, a serving General Packet Radio Service support node, a cell, a location area, a routing area, or a service area, occurred.

If the monitoring and detection of a trigger location change event is performed by user equipment for communicating in a cellular telecommunication network, said user equipment comprises means for monitoring whether a change an entering, or a leaving of one an area served by a mobile services switching centre, a serving General Packet Radio Service support node, a cell, a location area, a routing area, or a service area, occurred. It furthermore comprises means for initiating a determining of the location of the user equipment.

DETAILED DESCRIPTION OF THE INVENTION

Figure 1:
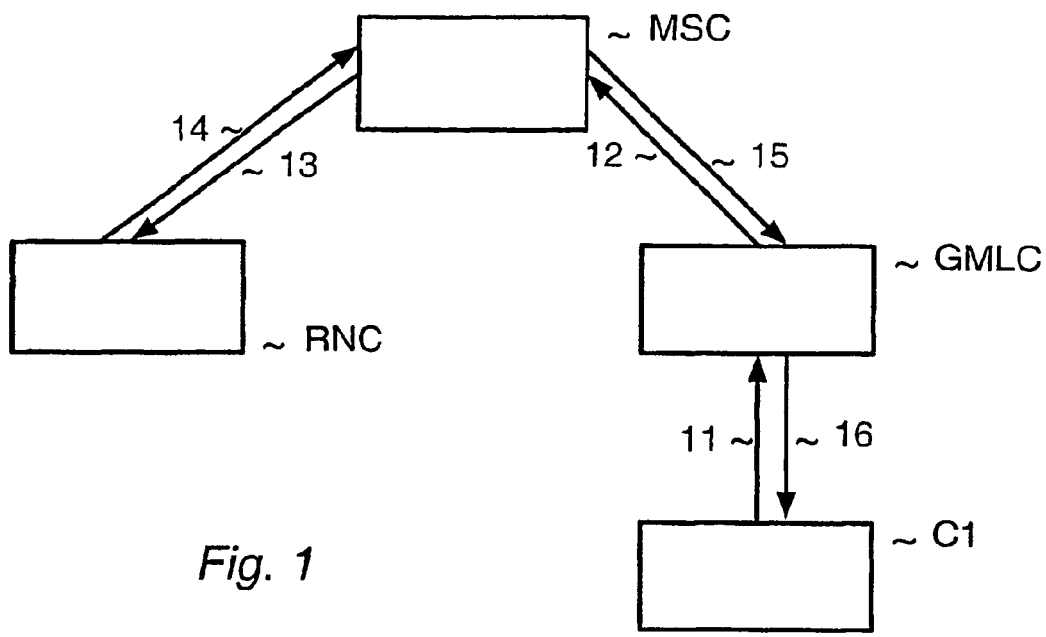
FIG. 1 depicts a signal flow according to the invention for a circuit switched cellular telecommunication network.

In the following the invention is described in more detail by means of embodiments and figures.

Cellular telecommunication networks store information about the location of a user in order to ensure the availability of a user. This information can be used for location information that is requested by a client as well. A client may be for example a charging system or subsystem, a provider of location services, user equipment or an emergency call centre.

In a radio access network of a cellular telecommunication network, the location of a mobile is known in different granularity, depending of the type of radio access network and the mobile connected state. The granularity of location information kept in the network for roaming subscribers is a trade off between saving cell updates and the number of paging messages to be sent. In signalling connected mode the granularity is the cell, where the mobile is connected.

During roaming of a user of the telecommunication network, the location is kept as location area in an mobile services switching centre for a circuit switched connected user and as routing area in a serving GPRS support node for a packet switched connected user.

During an active connection, in telecommunication networks operating according to UMTS (Universal Mobile Telecommunication System) standards, after the reception of a RAB (Radio Access Bearer) assignment response, the radio network controller knows the cell and the service area.

In GSM, during an active connection after an assignment response has been received, the base station controller knows the cell.

Information about the location of a user is certainly available with a lower accuracy than the mentioned granularity, for example implicitly by an identification of a node currently serving the user as for example a mobile services switching centre, a GPRS support node, a radio network controller, or a base station controller. From the node identification together with knowledge about the structuring of the network, i.e. the area served by the respective node, the location of the user can be determined.

The accuracy or granularity of the location information can depend on requirements of the client, privacy requirement of the user, available location information, processing and signalling effort to determine the location information, legal requirements, and alike.

As the information about areas associated to a certain node or the place and extension of a cell, a routing area, a location area and a service area is usually available only within the cellular telecommunication network, it is not significant for an external client.

To overcome this problem, two solutions are suggested:

The client is provided with a database for mapping an identification of a node, a cell, a routing area, a location area, or a service area to geographical coordinates. This database contains a table of identifications allocated to either the actual coordinates describing the respective area or at least one point and a radius that include the area.

If the operator does not want to provide information about the structuring of his network, the mapping of identification to area is done within the network.

The provision of deferred location reports is performed either for a certain time, indicated by a timer value or until the client terminates his request. To make sure that the provision of location information is continued even if a mobile services switching centre or serving GPRS support node change for the user occurred, the mobile services switching centre or respectively the serving GPRS support node signals to the gateway mobile location centre the change. The gateway mobile location centre determines the new mobile services switching centre or respectively the new serving GPRS support node and restarts the request for location information for the user.

In the following the invention is described in more detail by means of a so-called $3^{rd}$-generation-network comprising a core network, a UTRAN (UMTS Terrestrial-Radio Access Network) and a GERAN. A GERAN is a GSM (Global System for Mobile telecommunication)-EDGE (Enhanced Data rates for GSM Evolution) Radio Access Network.

The $3^{rd}$-generation-network keeps track of the subscriber's location. After assigning a RAB (Radio Access Bearer) for a user, UTRAN knows the location of the user on cell level. The cell is mapped to a service area. A service area stands for a geographical area, but it is decoupled from the cell structure to keep the physical information about the cell structure in UTRAN.

The core network uses the 'Location Reporting Control' and 'Location Report' RANAP (Radio Access Network Application Protocol) messages to get location information from UTRAN/GERAN over an Iu interface from a radio network controller of the access network. The messages are defined in the 3GPP technical specification TS 25.413, Version 5.0.0, published March 2002.

'Perform Location Request' and 'Perform Location Response' BSSMAP (Base Station System Management Application Part) messages are used towards the GERAN over an A interface between a mobile services switching centre and a base station controller. The messages as defined in the 3GPP technical specification TS 48.008, Version 5.4.0, published February 2002, are modified in so far as that they permit the request and accordingly the provision of location information not exclusively as geographical coordinates but also as information related to a structure of the cellular telecommunication network.

The core network requests the radio access networks to send location information when a user changes, enters or leaves a service area.

Location Report, Location Reporting Control, Perform Location Request and Perform Location Response are connection-oriented messages that can be used to receive location information. In order to gain information about the location of a user, the user must have an active signalling connection towards the cellular telecommunication network.

User equipment in GPRS has three different states IDLE, READY and STANDBY. Only in READY state an active signalling connection is established. After user equipment attaches its state changes from STANDBY to READY. It stays in READY state for a predefined timer value. When the timer value expires, the mobile changes from READY to STANDBY. The timer value can be set by the SGSN or by user equipment. It can be set to infinity, so that user equipment stays in the READY mode.

Several mechanisms exist to ensure that location information about a user can be derived at a required accuracy level.

A mobile in READY state moving between cells within the same SGSN routing area updates its SGSN with its location by sending a cell update packet. In a STANDBY state a mobile moving between cells within the same routing area does not send a cell update packet. Thus, if location of a user is required with accuracy more precise than routing area level, user equipment has to be kept in READY state.

Furthermore, as described in the 3GPP technical specification TS 25.305 Version 5.4.0, it is possible to force a change of state of user equipment from IDLE, i.e. a state without an active signalling connection, to READY state.

In the case that the trigger location change event is the change of a service area, the RANAP message Location Request or Location Reporting Control with the existing parameter 'inform on changes of service area' can be used. In that case, the radio network controller will inform the mobile services switching centre or the serving GPRS support node, whichever sent the Location Reporting Control of Location Request message, of every change of service area by the user. If the user moves from an area served by the radio network controller to an area served by another radio network controller, the message is sent to the new radio network controller for the continuation of the service. A service area at which a user is currently located can be determined if a PDP (Packet Data Protocol) context is established. As long as a PDP context is established, user equipment stays in a connected mode.

In a network operating according to GSM standards, it is always possible to track a change of a cell for a user.

The reporting of a location is not only possible on a per user base, that is that the location of a predefined user is reported, but also on a per area base. This means that a client can request that he receives an indication, whenever a user enters or leaves a particular predefined area, for example a service area, a location area, a routing area, a cell, an area served by an mobile services switching centre or a GPRS support node. This new kind of location report is interesting for example for location services or for charging purposes. The new service can be implemented for example by updating the interface between the client and the gateway mobile location centre and the interface between gateway mobile location centre and serving GPRS support node or mobile services switching centre. This can be implemented for example by introducing a new parameter in the RANAP Location Reporting Control message. In an embodiment of the invention, information about the speed of the user is sent together with location information when a subscriber enters or leaves the particular predefined area. The information about the velocity of the user can be used for traffic predictions and charging purposes. For example if a user enters an already congested area he may be subject of paying an extra fee.

Furthermore it is possible to track if a user moves from a first predefined area to a second predefined area, that is, if he crosses a border between two predefined areas. This can be implemented for example by transmitting and checking of two locations for a user. An area is a routing area, a location area, a service area, a cell, or an area served by a mobile services switching centre or a GPRS support node.

In the following the invention is described by means of FIG. 1.

FIG. 1 depicts a cellular telecommunication network comprising a radio network controller RNC, a mobile services switching centre MSC, and a gateway mobile location centre GMLC. The gateway mobile location centre GMLC is connected to a client C1. The client C1 sends in a first step 11 a LCS (Location Service) request message comprising parameter values identifying a user, demanding that a deferred location report for the user is requested, and that the trigger location change event is change of routing area. In a further embodiment of the invention the message also comprises a parameter with a parameter value that indicates whether the location shall be provided by geographical coordinates or by information related to the structure of the cellular telecommunication network.

In a further embodiment of the invention, the first step 11 may be performed by user equipment instead of the client C1. Therefore tan identification, for example an IMSI (International Mobile Subscriber Identification) is transmitted by DTAP signalling for mobile originating location request that is modified as described above. In the embodiment where the user equipment of the monitored user is the client, privacy measures can be omitted. Alternatively the user equipment may be entered as a client in the SLPP.

The gateway mobile location centre GMLC receives the message and transforms it in a next step 12 into a Provide Subscriber Location message comprising parameter values identifying a user, demanding that a deferred location report for the user is requested, and that the trigger location change event is change of routing area. The message is as defined in the 3GPP technical specification TS 29.002, version 5.1.0 published March 2002, is adapted accordingly so that it can carry the before mentioned information. Therefore the parameter LCS QoS (Quality of Service) specifying the response time and the accuracy of the location request is modified that it indicates that the LCS client can indicate the capability to recognize also the Location information in non-geographical coordinates format, i.e. mobile services switching centre number, serving GPRS support node number, location area, routing area, service area or cell identity. The gateway mobile location centre GMLC sends the message to the mobile services switching centre MSC.

The mobile services switching centre MSC receives the Provide Subscriber Location message in a next step 13. It transforms it into a location report control message that comprises an identification of the trigger location change event. In a further embodiment of the invention the message also comprises a parameter with a parameter value that indicates whether the location shall be provided by geographical coordinates or by information related to the structure of the cellular telecommunication network. The mobile services switching centre MSC sends the location report control message to the radio network controller RNC.

The radio network controller RNC monitors the user whether it changes the service area or not. When the radio network controller RNC detects a change of service area of the user, it sends a location report message in a next step 14 to the mobile services switching centre MSC. The location report message comprises an identification of the new service area in which the user is currently located. In an alternative embodiment of the invention the radio network controller RNC transformed the identification of the service area into geographical coordinates.

The mobile services switching centre MSC receives the location report message and forwards the location information in a Subscriber Location Report message together with an identification of the user to the gateway mobile location centre GMLC in a next step 15. The location information is sent as an identification of the service area in which the user currently is located. In an alternative embodiment the location information is sent as geographical coordinate.

The gateway mobile location centre GMLC receives the message. It transforms the identification of the service area into geographical coordinates and forwards the location information for the user in a LCS Service Response message to the client C1 together with an identification of the user. In an alternative embodiment of the invention the client C1 receives the identification of the service area.

In an embodiment of the invention, the location information is set to the user equipment as a client.

Figure 2:
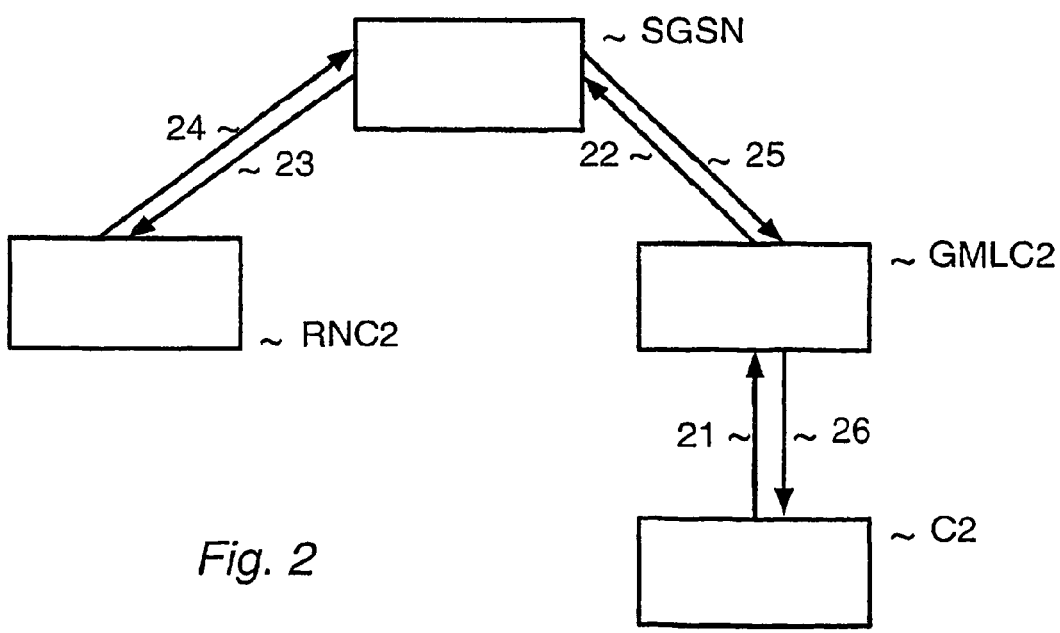
FIG. 2 depicts a signal flow according to the invention for a packet switched cellular telecommunication network.

FIG. 2 depicts a cellular telecommunication network comprising a radio network controller RNC2, a serving GPRS support node SGSN, and a gateway mobile location centre GMLC2. The gateway mobile location centre GMLC2 is connected to a client C2.

The client C2 sends in a first step 21 a LCS (Location Service) request message comprising parameter values identifying a user, demanding that a deferred location report for the user is requested, and that the trigger location change event is change of routing area. In a further embodiment of the invention the message also comprises a parameter with a parameter value that indicates whether the location shall be provided by geographical coordinates or by information related to the structure of the cellular telecommunication network.

In a further embodiment of the invention, the first step 21 may be performed by user equipment instead of the client C1. In the embodiment where the user equipment is the client, privacy measures can be omitted for the user equipment as the client. Alternatively the user equipment may be entered as a client in the SLPP.

The gateway mobile location centre GMLC2 receives the message and transforms it in a next step 22 into a Provide Subscriber Location message comprising parameter values identifying a user, demanding that a deferred location report for the user is requested, and that the trigger location change event is change of routing area. In a further embodiment of the invention the message also comprises a parameter with a parameter value that indicates whether the location shall be provided by geographical coordinates or by information related to the structure of the cellular telecommunication network. The gateway mobile location centre GMLC2 sends the message to the serving GPRS support node SGSN.

The serving GPRS support node SGSN receives the Provide Subscriber Location message in a next step 23. It transforms it into a location report control message that comprises an identification of the trigger location change event. In a further embodiment of the invention the message also comprises a parameter with a parameter value that indicates whether the location shall be provided by geographical coordinates or by information related to the structure of the cellular telecommunication network. The serving GPRS support node SGSN sends the location report control message to the radio network controller RNC2.

The radio network controller RNC2 monitors the user whether it changes the service area or not. When the radio network controller RNC2 detects a change of service area of the user, it sends a location report message in a next step 24 to the serving GPRS support node SGSN. The location report message comprises an identification of the new service area in which the user is currently located. In an alternative embodiment of the invention the radio network controller RNC2 transforms the identification of the service area into geographical coordinates.

The serving GPRS support node SGSN receives the location report message and forwards the location information in a Subscriber Location Report message together with an identification of the user to the gateway mobile location centre GMLC2 in a next step 25. The location information is sent as an identification of the service area in which the user currently is located. In an alternative embodiment the location information is sent as geographical coordinate.

The gateway mobile location centre GMLC2 receives the message. It transforms the identification of the service area into geographical coordinates and forwards the location information for the user in a LCS Service Response message to the client C2 together with an identification of the user. In an alternative embodiment of the invention the client C2 receives the identification of the service area.

In an embodiment of the invention the user equipment can act as a client and receives the location information either as an identification of an area or a geographical coordinates.

In general, the mapping of this location information to geographical coordinates can be done in any of the nodes involved, for example in the base station controller, radio network controller, mobile services switching centre, serving GPRS support node, home location register, home subscriber server or gateway mobile location centre.

The clients C1 or C2 use an identification of a service area for example to filter all users who are entering a particular service area. Such information may be used for traffic calculations or advertising purposes.

The client C1, C2 indicates the minimum accepted accuracy for the requested application in its LCS Service Request. This can be implemented by a new parameter in the existing MAP message Provide Subscriber Location, wherein the parameter indicates the lowest acceptable accuracy. For the user, a profile is stored, for example in the SLPP (Subscriber LCS Privacy Profile). The existing SLPP is expanded in a way that it comprises a new parameter with a parameter value describing the maximum accepted accuracy for the user on a per client basis. The new parameter value can be set by the existing MAP operation Insert Subscriber Data.

During the LCS privacy checks, an involved mobile services switching centre or serving GPRS support node verifies the maximum accepted accuracy by the subscriber for that client and the minimum accepted accuracy by the client.

If the maximum allowed accuracy by the subscriber is greater than or equal to the minimum accepted accuracy by the LCS client, the request is accepted. For the execution of the comparison and the selection of the determining of the location information, an accuracy given as an absolute distance is mapped. This mapping is performed according to a predefined table. The operator can predefine such tables for each services switching centre or serving GPRS support node, taking into account the respective topology of the network at the mobile services switching centre or serving GPRS support node. An example is given in the table below:

| Requested accuracy (K code) | Determining of location information by |
|---|---|
| 0–500 meters | Positioning method |
| 500–2000 meters | Cell or service area identification |
| 2000–4000 meters | Location area or service area identification |
| 4000–180000 meters | Mobile services switching centre or serving GPRS support node identification |

A node as for example a radio network controller, a mobile services switching centre or a serving GPRS support node that is to monitor a trigger location change event comprises means for detecting said event. This means may be implemented by software, hardware or a combination of both.

A user equipment that is to monitor a trigger location change event comprises means for detecting said event. This means may be implemented by software, hardware or a combination of both.

The invention claimed is:

1. Method for deferred provision of location information of a user of a cellular telecommunication network to a client external to the network, wherein the method comprises the steps of:
   defining or receiving a definition of at least one trigger location change event for the user, wherein the trigger location change event is defined as an entering or leaving of a particular predefined area, wherein information about the velocity of the user when entering or leaving the particular predefined area is provided to the client,
   receiving from the client a request for a deferred provision of location information for the user,
   monitoring said trigger location change event for said user,
   detecting the occurrence of the trigger event,
   determining the location of the user, wherein the user specifies the accuracy of location information provided to the client,
   transforming location information of the user related to a structure of the cellular telecommunication network into location information related to geographical coordinates, and
   providing the geographical coordinate location information, of the user to the client.

2. Method according to claim 1, wherein a trigger location change event is a change, an entering, or a leaving of one of an area served by a mobile services switching centre, a serving General Packet Radio Service support node, a cell, a location area, a routing area, or a service area.

3. Method according to claim 1, wherein the determining of the location of the user comprises the execution of a positioning method.

4. Method according to claim 1, wherein equipment of the user performs the monitoring and detecting of a trigger location change event and initiates the provision of the location to the client.

5. Method according to claim 1, wherein a node of the cellular telecommunication network performs the monitoring and detecting of a trigger location change event and initiates the provision of location information to the client.

6. Method according to claim 5, wherein a node performing home location register functions stores an indicator that a trigger location change event is defined for the subscriber.

7. Method according to claim 5, with the additional step of verifying that the user granted a permission to provide the client with location information.

8. A system for deferred provision of location information of a user of a cellular telecommunications network to a client external to the network, comprising:
   means for defining or receiving a definition of at least one trigger location change event for the user, wherein the trigger location change event is defined as an entering or leaving of a particular predefined area, wherein information about the velocity of the user when entering or leaving the particular predefined area is provided to the client;
   means for receiving from the client a request for a deferred provision of location information for the user;
   means for monitoring said trigger location change event for said user;
   means for detecting the occurrence of the trigger event;
   means for determining the location of the user, wherein the user specifies the accuracy of location information provided to the client;
   means for transforming location information of the user related to a structure of the cellular telecommunication network into location information related to geographical coordinates; and
   means for providing the geographical coordinate location information of the user to the client.

9. The system of claim 8 wherein a trigger location change event is a change, an entering or a leaving of one of areas served by a mobile switching center, a serving General Packet Radio Service support node, a cell, a location area, a routing area, or a service area.

10. The system of claim 8 wherein the determination of the location of user comprises the execution of a positioning method.

11. The system of claim 8 wherein equipment of the user performs the monitoring and detecting of a trigger location change event and initiates me provision of the location to the client.

12. The system of claim 8 wherein a node of the cellular telecommunication network performs the monitoring and detecting of a trigger location change event and initiates the provision of location information to the client.

13. The system of claim 12 wherein a node performing home location register function stores an indicator that a trigger location change event is defined for the subscriber.

14. The system of claim 12 further comprises means for verifying that the user granted a permission to provide the client with location information.

* * * * *

UNITED STATES PATENT AND TRADEMARK OFFICE
CERTIFICATE OF CORRECTION

PATENT NO. : 7,054,620 B2 Page 1 of 1
APPLICATION NO. : 10/474383
DATED : May 30, 2006
INVENTOR(S) : Ewert et al.

It is certified that error appears in the above-identified patent and that said Letters Patent is hereby corrected as shown below:

On The Title Page, Item (56), under "U.S. PATENT DOCUMENTS", in Column 2, Line 8, delete "6,799,032 B1" and insert -- 6,799,032 B2 --, therefor.

In Column 10, Line 49, in Claim 11, delete "me" and insert -- the --, therefor.

Signed and Sealed this

Eighteenth Day of December, 2007

JON W. DUDAS
*Director of the United States Patent and Trademark Office*